United States Patent Office 2,962,800
Patented Dec. 6, 1960

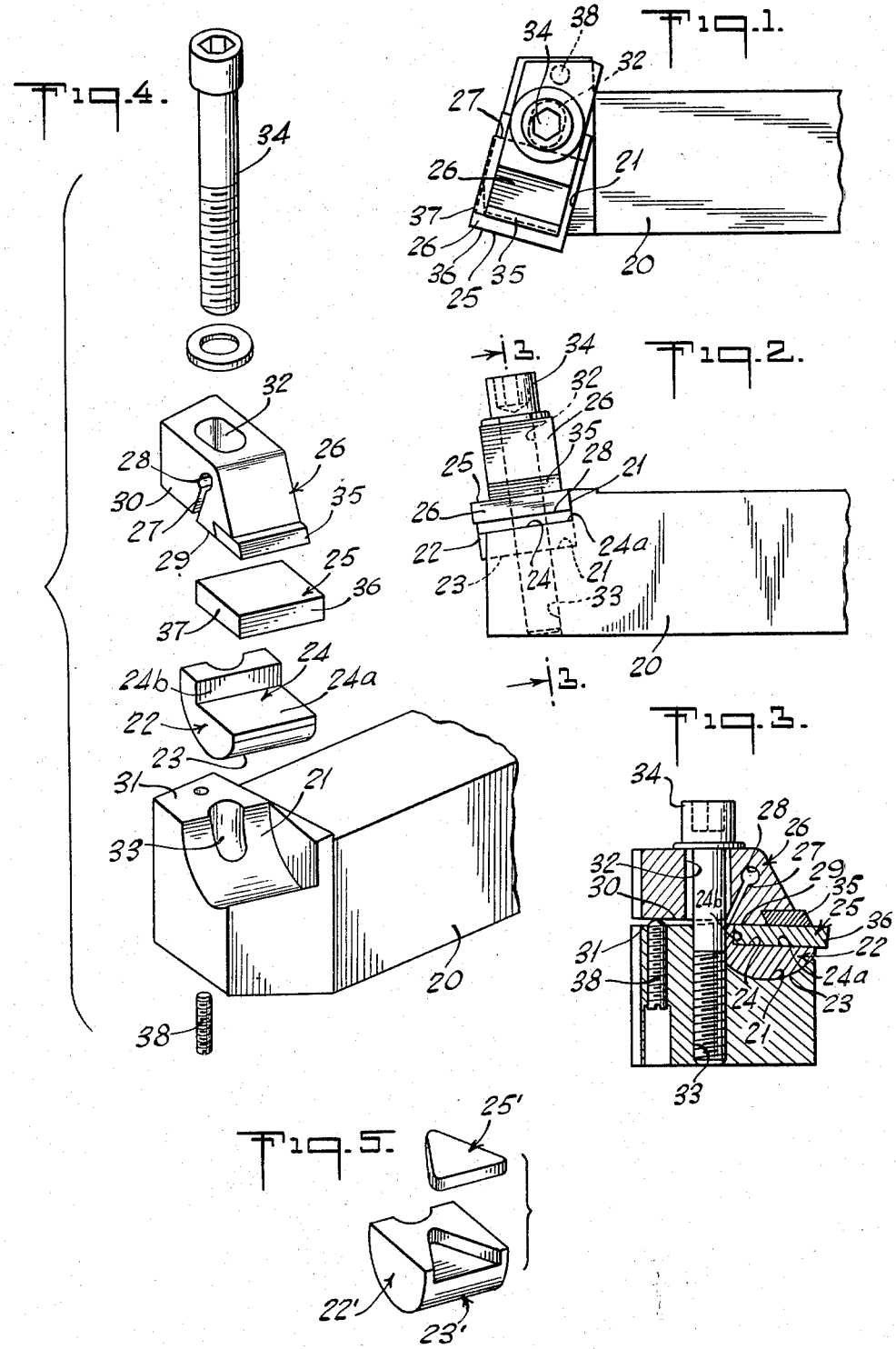

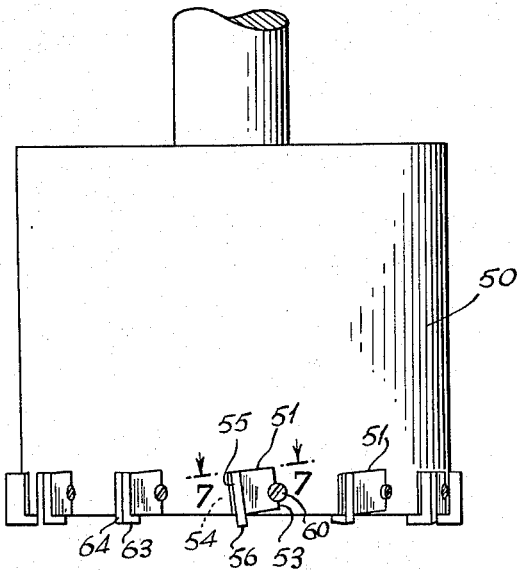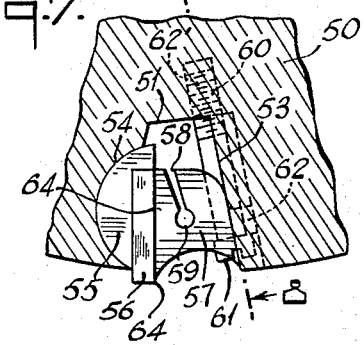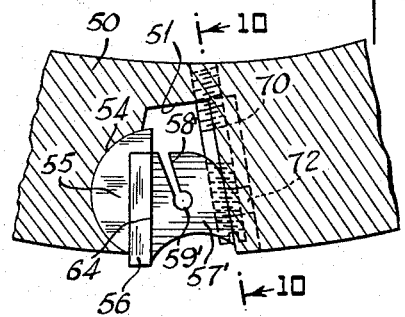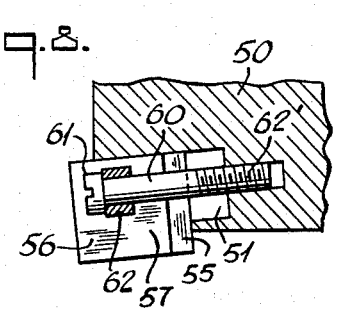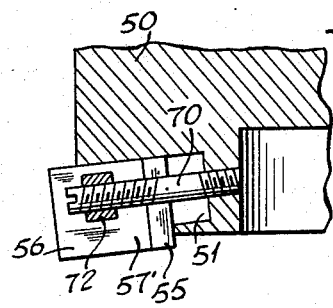

2,962,800

ADJUSTABLE CUTTER RAKE TOOL

Henry F. Swenson, West Orange, N.J.
(87 Dorsa Ave., Livingston, N.J.)

Filed June 12, 1956, Ser. No. 590,970

2 Claims. (Cl. 29—98)

This invention relates to an adjustable rake cutting tool.

It is an object of this invention to provide a hard bit cutting tool which will at all times present the tool to the work at the desired angle and yet which will yield under extreme pressure, without breaking the cutting edge or digging into the work, and nevertheless will return the bit to position when the pressure is released.

It is a further object to provide a tool of the character described which can employ hard bit cutters, such as carbide, in such a manner that a plurality of cutting edges of the tool may be used successively, but which will permit the cutting edge to yield without breaking the edge on encountering excessive pressures.

In the type of cutting tool having separable cutting bits, it is common to make the cutter of square or polygonal shape with its edge faces perpendicular to the flat faces, and to mount the flat face at a trailing angle to the work, so that the edge face at the cutting side has a proper rake angle with the work. In this manner, each of the edges of the bit may be employed as the cutting edge in turn, and each will have the same rake angle.

It is a further object to provide a holder of the character described, in which the rake angle may be adjusted at will to fit the nature of the work.

It is a further object to provide a construction for either a single bit cutter or a rotary miller in which a bit may be removed, or indexed, or replaced, without the need of any extensive readjustment.

The invention accordingly comprises the device, embodiments of which are hereinafter described, and are shown in the accompanying drawings, in which Fig. 1 is a top plan view of one embodiment; as used on a stationary single bit tool; Fig. 2 is a side elevation thereof; Fig. 3 is a section of the same embodiment on the line 3—3 of Fig. 2; Fig. 4 is a perspective exploded view showing the elements of which the device of Figs. 1 to 3 is made; Fig. 5 is an alternative form of bit and supporting blocks; Fig. 6 is a rotary miller having a plurality of bits embodying this invention; Fig. 7 is an enlarged section on the line 7—7 of Fig. 6; Fig. 8 is a section on the line 8—8 of Fig. 7; Fig. 9 is a structure alternative to Fig. 7; and Fig. 10 is a section on the line 10—10 of Fig. 9.

The construction of this device can be readily understood by reference to Fig. 4, in which the various elements are separated. This particular figure applies to a stationary tool. In this figure, the numeral 20 represents the customary rectangular bar by which the cutter tool is supported within a tool holder.

In accordance with this invention, this bar has a cavity 21 cut in its outer end in the shape of a segment of a cylinder to form a bearing recess. The axis of the cylinder, however, is not quite parallel to the axis of the bar 20, but instead is inclined downwardly and backwardly in reference to the axis of the bar, as seen in Fig. 4. A segmental block 22 shaped as a part of a cylinder, having its outer cylindrical surface 23 adapted to fit into the cylinder 21, has its upper surface cut out, shown at 24, to receive a cutter bit 25 having the form of a square wafer. The dimensions of the parts are such that when the bit 25 is within the recess 24, fitting against a flat surface 24a and against a vertical surface 24b of the cutout, the block and wafer together comprise approximately a semi-cylinder, except that the free edge of the bit 25 preferably extends a little over the edges of the flat surface 24a of the cutout.

The bit 25 is preferably made of a carbide such as carbaloy with all of its edges rectangular so that any edge face may be placed outwardly and the bit may be put in either side up, so that all eight of the longitudinal edges may be used as a cutting surface in turn. A clamping block 26 has on its under face a slot 27 extending up to a point near the upper face and terminating in a circular bore 28. The front portion 29 of the under face of this block, when the device is assembled, rests upon the top face of the block 22 and the top face of the bit 25, overlapping onto the top of block 22. The other part 30 of the under face of block 26 rests upon the top face 31 of the bar 20 beyond the edge of the block 22. A hole 32 is bored thru the block 26 and downwardly into the bar 20 at 33, where it is threaded to receive a screw 34 to hold the parts in their assembled relation.

I found it desirable to insert in the front of the lower base of the block 26 a carbide clip 35 cutting bar to receive and deflect hot clips resulting from the cutting operation.

With the device thus assembled, the position of the arm 20 with regard to the work will be determined by the tool holder on the machine; but, for any fixed position of bar 20, the angle at which the bit 25 is presented to the work will be determined by the rotary position of the block 22 in its cylindrical setting and the disposition is wholly determined by the clamping block 26. Thus the upper face of the bit will always lie in the plane of the lower face 29 of the front portion of the block 26.

The fact that the axis of the cavity 21 is inclined to the axis of the bar 20 provides the proper cutting angle for the side cutting edges 36 and 37 of the cutter bit 25. By reason of the fact that the block 26 is slotted at 27 and is formed of spring material, any blow which is transmitted to the cutting edge 36 of the bit, should it encounter a hard spot in the material to be cut, will cause the bit to yield by sliding the block 22 around its axis against the spring action of the block 26. A set screw 38, screwed into the bar 20 thru the face 31, raises or lowers the face 30 of the clamping block 26 and correspondingly alters the angle of the bit 25 upon its principal cutting edge 36. If, however, adjustment is not necessary in this respect, the screw 38 may be omitted, in which case the angle of the bit 25 will be determined by the shape of the clamping block 26 by altering the plane of the surface 30.

With this construction, the bit may be removed, reversed, or indexed or replaced, merely by unscrewing the screw 34, replacing a bit and screwing the screw back again.

The construction of Figs. 6, 7 and 8 shows the invention as applied to a rotary cutter. In this form, the cutter comprises a cylindrical body 50 having a plurality of recesses 51 in its lower outer edge, the shape and nature of which is more clearly shown in Figs. 7 and 8, and these recesses are generally wedge-shaped, being substantially flat upon one side 53 but having a cylindrical surface 54 on the other, to receive a block 55 similar to that of block 22 of the first modification, which is cut out as previously described, to receive a cutter bit 56, held in a flat cutout in the same manner that the cutter bit 25 is held in the prior embodiment. The segmental block 55 and the cutter 56 are held in place by a wedge-shaped clamping block 57 having one side adapted to bear upon the bit 56 and the other side to bear upon the surface 53, As in the previous modification, this clamping block 55 has a longitudinal slot 58 cut in its back face terminating in a circular bore 59 and the block itself is composed of spring material so that when it is wedged in place against the bit, the spring action permits a slight yielding of the bit should it encounter a serious blow on reaching a hard place in the material to be cut.

The clamping block 57 is held by a screw 60 having a head 61. This screw passes thru an ear 62 upon the clamping block 57 and screws into the body 50, as shown at 62.

The angle which the cutting edge 64 at the end of the block presents to the work will, as will be readily seen, be determined by the angle which the axis of the cylindrical segment 54 bears to the cutting plane. The angle of the cutting edge 65, however, is determined by the angle of the face 53 of the recess, which is fixed, and by the angularity of the faces of the clamping block 57. On this account, the cutting angle of the face 64 can be changed by substituting new blocks 57 having a different angle, in place of those previously used.

The construction of Figs. 9 and 10 differs from that of Figs. 7 and 8 only in that the screw 60 of Fig. 7 is replaced by a right and left hand screw 70 in Fig. 9, one end of which, for the right hand screw, screws into the body and the outer end for the left hand thread screws into the ear 72 on the block 57. In the figures the elements designated by a prime mark ('), i.e. 57', 58' and 59' are substantially identical with the parts 57, 58 and 59 of the other views.

In Figs. 1–4 and 6–10, the bit 25 is shown as perfectly square. For some purposes it may be desired to employ a cutter of other shape, as for example, a triangular shape as shown at 25' in Fig. 5. In such case the cutout 24 corresponding with the cutout 24' will be shaped to fit the bit.

With any of these constructions, it will be clear that the bit may be indexed to utilize all of its six or eight cutting faces, and it may be replaced at will simply by taking out the one bit and putting in a new one, without the need of any new adjustment. Thus particularly in the rotary type of cutter, the cutter may be used at maximum efficiency for the minimum of labor for the replacement of cutters.

What is claimed:

1. A tool holder comprising a supporting block having a cut out in one face, in the shape of a segment of a cylinder, a cutter holding member conforming to the shape of said cut out having a face in a diametric plane, a cutter bit inset into said member with its cutting edge beyond the edge of said block and one face in said diametric plane, said cutter holding member and said cutter bit forming together a substantially semi-cylindrical member, a presser block having a face resiliently engaging said cutter holding member and said cutter bit on said diametric plane, and means to control the angle of said presser block face to alter the angle of the cutter bit about the center line of curvature of said cylindrical cut out.

2. A device according to claim 1 in which the presser block is bifurcated, having one of its legs bearing on said diametric face and the other adjustably engaging said supporting block whereby the cutting edge is yieldingly held in cutting position and the angle of the cutter bit about the center line of curvature of said cylinder may be adjusted.

References Cited in the file of this patent

UNITED STATES PATENTS

| | | |
|---|---|---|
| 909,401 | Haber | Jan. 12, 1909 |
| 1,212,271 | Smith | Jan. 16, 1917 |
| 1,245,020 | Pranarosa | Oct. 30, 1917 |
| 1,320,698 | Lehman | Nov. 4, 1919 |
| 1,423,245 | Moore | July 18, 1922 |
| 1,636,898 | Bugatti | July 26, 1927 |
| 1,736,449 | Lipp | Nov. 19, 1929 |
| 1,776,335 | Rauzieres | Sept. 23, 1930 |
| 1,948,648 | Buchmuller | Feb. 27, 1934 |
| 2,150,959 | Bergstrom | Mar. 21, 1939 |
| 2,181,023 | Moore | Nov. 21, 1939 |
| 2,327,944 | Houbhans | Aug. 24, 1943 |
| 2,458,946 | Johnston | Jan. 11, 1949 |
| 2,521,035 | Boyle | Sept. 5, 1950 |

FOREIGN PATENTS

| | | |
|---|---|---|
| 465,537 | Great Britain | May 10, 1937 |